3,291,611
MODIFYING ISOELECTRIC POINT OF GELATIN
John J. Krajewski, Wheeling, Ill., assignor to Swift & Company, Chicago, Ill., a corporation of Illinois
No Drawing. Filed Oct. 3, 1962, Ser. No. 227,988
9 Claims. (Cl. 96—114)

The present invention relates in general to the modification of proteinaceous material. More specifically, this invention relates to the graft polymerization of ethylenic polymerizable acidic monomers with proteinaceous material. The invention also concerns the modification of acid-cured gelatin and glue so as to be acceptable for photographic purposes.

Gelatin and similar protein material are employed extensively in the manufacture of photographic products and similar products wherein a colloidal emulsion is desired. Various attempts have been made to replace or supplant the gelatin with polymeric materials for use in coating on film bases or other film supports. However, mixtures of polymeric materials with protein substances have been unsatisfactory because of mechanical and optical incompatibility of the polymer with the gelatin or other proteinaceous material. Usually, most of the water-soluble polymers are incompatible with the gelatinaceous material at some stage of the coating operation or they do not maintain the properties of the emulsion to the extent required.

Furthermore, it has been necessary to employ especially pure grades of proteinaceous material. It has also been necessary to employ a special type of gelatin in order to obtain satisfactory results in the manufacture of photographic products. The unacceptability of acid-cured gelatin is believed to be due to a high isoelectric point of between about pH 7–9. On the other hand, alkali-cured gelatin, which has an isoelectric point of about pH 4.7–5.0, has been found acceptable and is, indeed, utilized extensively in the photographic industry. However, the production of alkali-cured gelatin has several disadvantages. The lime cure involves soaking gelatin stock in a saturated solution of calcium hydroxide for three to twelve weeks, after which the excess lime is removed by washing, sufficient acid is added to adjust the pH of the stock to about 6.0–7.5, and washing continuing to remove most of the calcium salts so formed. Obviously the alkali-curing method, requiring long periods of time and curing facilities, is relatively expensive.

If cured by acid, the collagenous material, most often pork skins, is soaked in an acid solution (usually hydrochloric acid) containing enough acid to adjust the stock to a pH of about 3.5–4.2, and then washed to remove excess acid. Acid curing differs somewhat from alkali curing in that little or no mucin is removed. The production of acid-cured gelatin requires only a few hours and no holding of the skins in large curing tanks for any extended period of time. Since the acid-cure is less time consuming, the largest proportion of gelatin stock is cured by this process. It therefore becomes apparent that a simple, inexpensive method for altering the properties of acid-cured gelatin to approximate those of alkali-cured gelatin would be of great value.

It has now been found the proteins having a high isoelectric point can be reacted with vinyl type acidic monomeric materials so as to lower the isoelectric point to an acceptable range. More specifically, it has been found that the acid-cured gelatin, having a relatively high pH, can be reacted with vinyl acidic monomers to produce a graft type modified gelatin having properties similar to alkali-cured gelatin.

Therefore, it is an object of this invention to produce a new and useful polymer product utilizing a proteinaceous material.

It is also an object of this invention to prepare polymeric material by the graft polymerization of an unsaturated acidic monomer with a proteinaceous material to produce products which can be utilized in the manufacture of photographic emulsions.

Another object of this invention is to provide a method for lowering the isoelectric point of proteins possessing a relatively high isoelectric point.

A further object is to provide a simple, inexpensive method for altering the properties of acid-cured gelatin so as to render it acceptable for photographic purposes.

Additional objects, if not specifically set forth herein, will be readily apparent to those skilled in the art from the detailed description of the invention which follows.

In general, the present invention relates to the modification of proteinaceous material to produce new polymeric materials. The products produced by this invention are graft polymers consisting of greater than 95% by weight protein material and less than 5% by weight of polymeric material. The method of producing the graft polymers comprises the polymerization of a monocarboxylic monomer and proteinaceous material in the presence of an aqueous medium. The products of this invention are useful in the manufacture of photographic emulsions, pharmaceutical products, and in the preparation of a variety of protective protein colloids.

More specifically, the modified proteins of this invention are prepared by the treatment of an aqueous solution of gelatin, hydrolyzed gelatin, bone glue or other proteinaceous substance having an isoelectric point of about pH 7–9 with or without the aid of surface-active dispersing agents. The polymeric material consists of the polymerizable vinyl type acidic monomers capable of forming a graft type polymer with the glue or gelatin. In general, the polymerizable acidic monomers can be characterized as containing an ethylenic group and possessing a monocarboxylic functional group. Preferred acid monomers are those of the acrylic acid series and can be characterized as

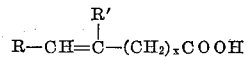

wherein $x$ is from 0 to about 8 and R and R' are hydrogen or alkyl radicals of about 1 to 12 carbon atoms. The most preferred acidic monomers include those wherein the alkyl radicals are from 1 to 5 carbons, such as acrylic, crotonic, methacrylic, ethacrylic, propacrylic, butacrylic, pentacrylic acids, etc.

The graft type polymers of this invention should be distinguished from the acylated gelatins formed by the reaction of gelatin with saturated polycarboxylic acids or anhydrides carried out at specific pH and temperature ranges. Furthermore, the products of this invention are not mixtures of the acidic monomers and proteinaceous materials, but are chemically combined substances. The products are a chemical combination of the protein component and a polymerizable monomer and are formed by the graft polymerization between the protein fragment and the growing polymer chain.

At this point, it should be understood that when a given quantity of monomer is added to polymerize a given quantity of proteinaceous substance, the actual amount of monomer incorporated (chemically combined) in the process is substantially less than the amount used. For example, when 5% methacrylic acid is reacted with gelatin, only about 1% was actually incorporated. Since the pH of pure polymethacrylic acid (25% solution) is 4.0, this is the lowest obtainable isoelectric point on the basis of the amount of monomer incorporated. An isoelectric point of approximately 4.0 can be obtained when 2.05% methacrylic acid is incorporated in the product. Any quantity of methacrylic acid in excess of this quantity would be superfluous as far as lowering the isoelectric point of acid cure gelatin is concerned.

The well-nown peroxide type polymerization catalysts are employed in carrying out the polymerization of the acidic monomer and protein fragment. These catalysts include hydrogen peroxide; the organic peroxides such as acetyl peroxide, tertiary butyl hydroperoxide, benzoyl peroxide, lauryl peroxide, the persulfates such as sodium, potassium or ammonium persulfates; as well as the perborates, percarbonates, and other well-known percatalysts. Similarly, polymerization may be accomplished by irradiation, as well as through the use of the above well-known catalysts.

The polymerization is effected at a temperature of about 40 to 100° C. over a period of time of up to about 3 or 4 hours. Usually, a temperature of about 85° C. and a period of time of about 1 hour is quite satisfactory. It should be noted, however, that the temperature and time will vary in accordance with well-known polymerization practice.

The various surface-active dispersong agents employable in this invention can be of the anionic, cationic or amphoteric type. Typical surfactants which can be employed are the salts of aromatic sulfonic acids such as the alkali metal salts of alkyl-substituted benzene or naphthalene sulfonic acid; the alkali metal salts of the higher fatty acids such as the sodium and potassium salts of lauric, myristic, palmitic, and stearic acid, etc. In practice, however, it is found that such surface-active dispersing agents are unnecessary.

The following examples typify the polymers of the present invention and the method for producing them and are to be construed as illustrative of, and not as limiting, the scope of the invention.

*Example I*

A solution of 194 grams of acid-cured gelatin having an isoelectric point of about 8.7 and 400 ml. of water was placed in a resin kettle equipped with a thermometer, a reflux condenser, and a motor driven stirring paddle. The mixture was heated on a water bath to a temperature of around 85° C. and 1 ml. of 35% hydrogen peroxide was added. After heating and stirring for 1 minute, 6 grams of methacrylic acid was added. The reaction mixture was heated and agitated for 1½ hours. The resulting product was gelled in pans, air dried on screens and milled to a granular solid. A portion of the product was placed in a Visking sausage casing and dialyzed against distilled water for three days in a refrigerator. The spent distilled water was replaced with fresh distilled water twice a day. The product was subjected to cataphoretic analysis to determine its mobility at different pH values and its isoelectric point was found to be 7.1.

*Example II*

A solution of 190 grams of acid-cured gelatin having an isoelectric point of about 8.7 and 400 ml. of water was placed in a resin kettle equipped with a thermometer, a reflux condenser and a motor driven stirring paddle. The mixture was heated on a water bath to a temperature of around 80° C. and one ml. of 35% hydrogen peroxide was added. While the mixture was being heated, 10 grams of acrylic acid monomer was added. The reaction solution was heated and agitated for 1 hour. The resulting product was dried, screened, milled and dialyzed as in Example I. The product had an isoelectric point of 6.25.

Similar results were obtained using other combinations of reactants to form products having an isoelectric point from pH 4–8.7. The change of electrophoretic mobility v. pH and isoelectric point v. amount of acidic monomer used was graphed. It was noted that the shape of the curve obtained by plotting electrophoretic mobility v. pH of the modified acid-cured gelatin is similar to that of unmodified alkali-cured gelatin. Accordingly, the instant invention provides a method for lowering the isoelectric point of proteins and more specifically the conversion of acid-cured gelatin to a form readily acceptable for photographic purposes.

As mentioned previously, when a given quantity of monomer is added to polymerize a given quantity of protein, the actual amount of monomer incorporated in the process is substantially less than the amount of monomer used. The amount of monomer used and the amount actually incorporated into the product was plotted against the isoelectric point of the final graft polymer. It was found that when methacrylic acid in the amount of 5% was reacted, the amount actually incorporated was a little over 1% yet the isoelectric point of the acid-cured gelatin fell from 8.7 to 6.2. Approximately .75% of the vinyl monomer was chemically combined when 3% of the monomer was reacted with the protein and the product had an isoelectric point of about 7.1. By extrapolation it was found that about 2% methacrylic acid would be chemically combined when about 9½ grams of acid were reacted with 100 grams of protein and the isoelectric point would then be close to 4.0. Accordingly, the instant invention is mainly directed to the use of less than 10% by weight of acidic monomer to incorporate less than 5% monomer, when reacted with the proteinaceous substance.

One of the more important advantages of the instant invention is that the modified "gelatin" retains its gelatin-like properties. Gelatin graft type polymers containing more than 5% of polymerizable acid monomers are insoluble at pH ranges between 2 to 4.5. However, the instant graft type polymers will not precipitate out at the desirable low pH values. Perhaps, the most striking advantage of this invention is the fact that the relatively cheap acid-cured gelatinaceous materials can now be used for photographic purposes in all areas where alkali-cured gelatin has been used before. The products of this invention are useful as colloidal binding agents for silver halide grains, and for water-insoluble pigments and dyes in filter and antihalation layers of photographic elements. They may also be used in subbing layers and anti-abrasion layers of photographic films. They are also useful in glue compositions, in dye printing pastes and water-permeable colloids.

The products of this invention can be used alone or in admixture with alkali-cured gelatin or the like to produce coatings having good optical clarity. The compositions can be employed in coatings on any of the well-known film support material using any of the conventional procedures. Cellulose triester films, polyester type films, paper bases as well as glass plates and other similar film supports can be coated with the modified acid-cured gelatinaceous material of this invention. The gelatinaceous materials can be utilized in either the subbing layer or in one or more of the emulsion layers such as the photo sensitive emulsion layer acting as a protective colloid to prevent the particles of silver bromide from becoming too coarse.

The modified acid-cured gelatin products of this invention can also be used in conjunction with alkali-cured gelatin in the manufacture of hard gelatin capsules for the pharmaceutical industry. For example, about equal amounts of modified acid-cured and alkali-cured gelatin can be used in a relatively concentrated solution in automatic dipping operations. The resulting cylindrical closed-end films are filled with medicaments. Such capsules have good physical qualities such as toughness, and freedom from cloudiness, etc.

While the instant invention has been described in reference to certain preferred embodiments, obviously many modifications and variations of the invention as hereinbefore set forth may be made without departing from the spirit and scope thereof, and therefore only such limitations should be imposed as are indicated in the appended claims.

I claim:
1. A photographic material comprising a support and a coating thereon of an emulsion of a silver halide and a modified gelatinaceous substance, said modified gelatinaceous substance comprising at least about 95% acid-cured gelatin and less than about 5% polymerized carboxylic vinyl acidic monomer.
2. The photographic material of claim 1 wherein the acidic monomer is selected from the group consisting of acrylic acid and methacrylic acid.
3. A photographic emulsion comprising a silver halide and a graft type polymeric material comprising at least about 95% by weight of an acid-cured gelatin and less than about 5% by weight of polymerized carboxylic vinyl acidic monomer.
4. The emulsion of claim 3 wherein the acidic monomer is a member selected from the group consisting of acrylic and methacrylic acids.
5. A method for lowering the isoelectric point of an acid-cured proteinaceous substance which comprises admixing and heating carboxylic vinyl acidic monomer with said proteinaceous substance in the presence of a vinyl type polymerization catalyst, said acidic monomer being in an amount of up to 5% by weight based upon the amount of proteinaceous substance.
6. A method for converting acid-cured gelatin so that it will possess isoelectric point properties acceptable for photographic use which comprises heating and incorporation into said acid-cured gelatin, in the presence of a vinyl type polymerization catalyst not more than 5% of a polymerizable carboxylic vinyl acidic monomer.
7. The method of claim 6 wherein the acidic monomer is selected from the group consisting of acrylic and methacrylic acid.
8. A method for lowering the isoelectric point of acid-cured gelatin so that it will possess isoelectric point properties acceptable for use in photographic systems which comprises admixing and heating a carboxylic vinyl acidic monomer having the formula

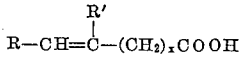

wherein $x$ is an integer from 0 to about 8, and R and R' are selected from the group consisting of hydrogen and alkyl radicals of about 1 to 12 carbon atoms with said acid-cured gelatin in the presence of a vinyl-type polymerization catalyst, said acidic monomer being in an amount of up to about 5% by weight based upon the weight of the acid-cured gelatin.
9. The method of claim 8 wherein the acidic monomer is acrylic acid.

References Cited by the Examiner
UNITED STATES PATENTS

| | | | |
|---|---|---|---|
| 2,763,625 | 9/1956 | Illingsworth et al. | 96—87 |
| 2,787,545 | 4/1957 | Gates et al. | 96—114 |
| 2,831,767 | 4/1958 | Dann et al. | 96—114 |
| 2,852,382 | 9/1958 | Illingsworth et al. | 96—114 |
| 3,184,312 | 5/1965 | Gates et al. | 96—94 |

OTHER REFERENCES

Cohen: PSA Journal, Section B, pp. 105–108, August 1953.

NORMAN G. TORCHIN, *Primary Examiner.*

J. T. BROWN, *Assistant Examiner.*